US012522410B2

(12) United States Patent
Scotton et al.

(10) Patent No.: US 12,522,410 B2
(45) **Date of Patent: *Jan. 13, 2026**

(54) SELF-VENTING CLOSURE

(71) Applicant: Silgan Dispensing Systems Slatersville, LLC, Slatersville, RI (US)

(72) Inventors: James E. Scotton, Foxborough, MA (US); Patrick J. Brannon, Warwick, RI (US)

(73) Assignee: Silgan Dispensing Systems Slatersville, LLC, Slatersville, RI (US)

( * ) Notice: Subject to any disclaimer, the term of this patent is extended or adjusted under 35 U.S.C. 154(b) by 149 days.

This patent is subject to a terminal disclaimer.

(21) Appl. No.: 18/173,401

(22) Filed: Feb. 23, 2023

(65) Prior Publication Data

US 2023/0192371 A1 Jun. 22, 2023

Related U.S. Application Data

(63) Continuation-in-part of application No. 17/929,529, filed on Sep. 2, 2022, which is a continuation of (Continued)

(51) Int. Cl.
*B65D 51/16* (2006.01)
*B65D 1/20* (2006.01)

(Continued)

(52) U.S. Cl.
CPC ..... *B65D 51/1644* (2013.01); *B65D 51/1683* (2013.01); *B65D 51/1688* (2013.01);

(Continued)

(58) Field of Classification Search
CPC B65D 51/1644; B65D 51/1616; B65D 41/04; B65D 77/225; B65D 81/2038;

(Continued)

(56) References Cited

U.S. PATENT DOCUMENTS 456,028 A * 7/1891 Foster .................... F16K 15/20 152/429
2,224,296 A 12/1940 Hoffman (Continued)

FOREIGN PATENT DOCUMENTS

AU 2013204434 B2 12/2016
DE 4041536 A1 * 6/1992

(Continued)

*Primary Examiner* — Orlando E Aviles
*Assistant Examiner* — Brijesh V. Patel
(74) *Attorney, Agent, or Firm* — Hinckley Allen & Snyder; Stephen Holmes

(57) ABSTRACT

A self-venting closure assembly includes a closure body having a deck with a peripheral mounting skirt and an annular seal on an underside of the deck adjacent to the peripheral mounting skirt, further including a circular valve seat within the center portion of the deck, and a plurality of vent openings circumferentially spaced within the valve seat, all surrounded by an annular spillover wall. An elastomeric umbrella valve is centrally mounted to the deck and has a frustoconical valve flap arranged on an underside of the valve seat. The valve flap cooperates with the vent openings to normally seal the vent openings but permits air to flow into an interior of the closure body when a vacuum is applied to an interior of the container on which the closure is mounted.

17 Claims, 13 Drawing Sheets

Related U.S. Application Data application No. 16/917,863, filed on Jun. 30, 2020, now Pat. No. 11,440,710.

(51) Int. Cl.
*B65D 25/40* (2006.01)
*B65D 25/42* (2006.01)
*B67D 3/00* (2006.01)

(52) U.S. Cl.
CPC .................. *B67D 3/00* (2013.01); *B65D 1/20* (2013.01); *B65D 25/40* (2013.01); *B65D 25/42* (2013.01)

(58) Field of Classification Search
CPC ... B65D 2205/00; F16K 15/148; F16K 17/02; F16K 27/0209; Y10T 137/789; Y10T 137/784; Y10T 137/7826; Y10T 137/7837; Y10T 137/7847; Y10T 137/786; Y10T 137/7869
USPC ............. 220/200, 202, 203.1, 203.19, 367.1, 220/203.13; 215/200, 247, 248, 260, 307, 215/311; 222/1, 153.06, 481.5, 490–491, 222/494; 137/854, 512.15, 505.42, 511, 137/513.3, 516.13, 517
See application file for complete search history.

(56) References Cited

U.S. PATENT DOCUMENTS

| | | | | | |
|---|---|---|---|---|---|
| 2,225,395 | A | * | 12/1940 | Young | F16K 15/1402 137/512.15 |
| 2,571,893 | A | * | 10/1951 | Kendall | H01M 50/308 137/854 |
| 2,894,524 | A | | 7/1959 | Gill | |
| 3,159,176 | A | * | 12/1964 | Russell | B60T 11/28 137/493.1 |
| 3,454,182 | A | | 7/1969 | Morton | |
| 3,511,407 | A | | 5/1970 | Palma | |
| 3,595,429 | A | | 7/1971 | Kohen | |
| 3,812,994 | A | * | 5/1974 | Feldman | B65D 41/3404 215/256 |
| 3,941,149 | A | * | 3/1976 | Mittleman | A61M 39/24 137/493.1 |
| 4,019,629 | A | | 4/1977 | Dubner et al. | |
| 4,135,513 | A | | 1/1979 | Arisland | |
| 4,177,831 | A | * | 12/1979 | Benjamin | F16K 17/14 137/513.5 |
| 4,210,255 | A | | 7/1980 | Pan | |
| 4,360,326 | A | | 11/1982 | Buchholz et al. | |
| 4,401,224 | A | | 8/1983 | Alonso | |
| 4,420,101 | A | | 12/1983 | O'Neill | |
| 4,428,478 | A | | 1/1984 | Hoffman | |
| 4,506,809 | A | | 3/1985 | Corsette | |
| 4,640,426 | A | | 2/1987 | Wasley | |
| 4,750,314 | A | | 6/1988 | Mietz et al. | |
| 4,763,802 | A | | 8/1988 | Johnston | |
| 4,842,165 | A | * | 6/1989 | Van Coney | B65D 47/2018 222/105 |
| 5,027,784 | A | | 7/1991 | Osawa et al. | |
| 5,129,426 | A | | 7/1992 | Boehmer | |
| 5,240,149 | A | * | 8/1993 | Schmidt | B05B 11/043 222/215 |
| 5,385,252 | A | * | 1/1995 | Hidding | B65D 41/0421 215/354 |
| 5,390,828 | A | * | 2/1995 | Gross | B65D 47/26 222/481.5 |
| 5,397,024 | A | | 3/1995 | Wu et al. | |
| 5,433,353 | A | * | 7/1995 | Flinn | B65D 51/1672 222/206 |
| 5,449,079 | A | | 9/1995 | Yang | |
| 5,507,318 | A | | 4/1996 | Israelson | |
| 5,619,972 | A | | 4/1997 | Kuenzli et al. | |
| 5,649,859 | A | | 7/1997 | Shiga | |
| 5,725,016 | A | * | 3/1998 | Nickel | F16K 17/18 137/493.1 |
| 5,848,690 | A | | 12/1998 | Granger et al. | |
| 5,908,129 | A | | 6/1999 | Schutz | |
| 5,913,437 | A | * | 6/1999 | Ma | B65D 41/3428 215/329 |
| 5,944,211 | A | | 8/1999 | Woodnorth et al. | |
| 5,974,819 | A | | 11/1999 | Poling et al. | |
| 5,988,414 | A | | 11/1999 | Schwarz et al. | |
| 6,021,912 | A | | 2/2000 | Hertrampf | |
| 6,035,769 | A | | 3/2000 | Nomura et al. | |
| 6,341,721 | B1 | | 1/2002 | Herald et al. | |
| 6,364,163 | B1 | | 4/2002 | Mueller | |
| 6,516,829 | B1 | | 2/2003 | Townsend et al. | |
| 6,557,462 | B1 | | 5/2003 | Wang | |
| 6,644,510 | B2 | | 11/2003 | Kawolics et al. | |
| 6,874,656 | B2 | | 4/2005 | Rohr et al. | |
| 6,883,675 | B2 | | 4/2005 | Maenke | |
| 6,951,295 | B1 | | 10/2005 | Gaus et al. | |
| 6,981,602 | B2 | * | 1/2006 | Ma | B29C 43/50 215/256 |
| 7,082,967 | B2 | | 8/2006 | Sarajian et al. | |
| 7,101,640 | B1 | * | 9/2006 | Kump | H01M 50/308 429/72 |
| 7,201,287 | B2 | | 4/2007 | Maenke | |
| 7,249,694 | B2 | | 7/2007 | Masuda | |
| 7,500,585 | B2 | | 3/2009 | Masuda | |
| 7,621,416 | B2 | | 11/2009 | Bursztein | |
| 7,900,788 | B2 | | 3/2011 | Gaillot et al. | |
| D643,288 | S | | 8/2011 | Taylor | |
| 8,066,133 | B2 | * | 11/2011 | Takamatsu | B65D 41/0421 215/307 |
| 8,096,438 | B2 | * | 1/2012 | Schmalz | F02M 37/20 220/521 |
| 8,146,765 | B2 | | 4/2012 | Chen | |
| 8,317,064 | B2 | * | 11/2012 | Pang | B65D 37/00 222/481 |
| 8,376,164 | B2 | | 2/2013 | Perrin et al. | |
| 8,434,633 | B2 | | 5/2013 | Beer et al. | |
| D687,709 | S | | 8/2013 | Taylor | |
| 9,211,979 | B2 | * | 12/2015 | Ekkert | B26F 1/20 |
| 9,618,131 | B2 | | 4/2017 | Lee | |
| 9,701,452 | B2 | | 7/2017 | Lackey et al. | |
| 9,713,402 | B2 | | 7/2017 | Park | |
| 9,714,126 | B2 | | 7/2017 | Rye et al. | |
| 10,273,061 | B1 | | 4/2019 | Lin | |
| 11,090,669 | B2 | * | 8/2021 | Beer | B05B 11/048 |
| 2003/0038131 | A1 | | 2/2003 | Noruma et al. | |
| 2005/0045666 | A1 | | 3/2005 | Kasting | |
| 2007/0205194 | A1 | | 9/2007 | Tung | |
| 2008/0105674 | A1 | | 5/2008 | Hsu | |
| 2008/0110911 | A1 | | 5/2008 | Chen | |
| 2008/0178884 | A1 | | 7/2008 | Gerson et al. | |
| 2010/0084396 | A1 | | 4/2010 | Wu | |
| 2010/0263328 | A1 | | 10/2010 | Dorsey et al. | |
| 2012/0138171 | A1 | | 6/2012 | Coolens et al. | |
| 2012/0248110 | A1 | | 10/2012 | Wu | |
| 2012/0267369 | A1 | | 10/2012 | Duvigneau | |
| 2013/0200036 | A1 | * | 8/2013 | Delage | B65D 41/0442 215/344 |
| 2017/0348715 | A1 | * | 12/2017 | Beer | B05B 11/048 |
| 2019/0337691 | A1 | * | 11/2019 | Kim | B65D 41/325 |
| 2020/0223597 | A1 | * | 7/2020 | Neputy | B65D 41/3423 |

FOREIGN PATENT DOCUMENTS

| | | | | | |
|---|---|---|---|---|---|
| DE | 102017223074 | A1 | * | 6/2019 | |
| GB | 2249084 | A | | 2/1995 | |
| WO | 2016089912 | A1 | | 6/2016 | |
| WO | WO-2021262516 | A1 | * | 12/2021 | B65D 41/0407 |

* cited by examiner

SELF-VENTING CLOSURE

CROSS-REFERENCE TO RELATED APPLICATIONS

This application is a continuation-in-part of U.S. application Ser. No. 17/929,529, filed Sep. 2, 2022, which is a continuation of U.S. application Ser. No. 16/917,863, filed Jun. 30, 2020, now U.S. patent Ser. No. 11/440,710, issued Sep. 13, 2022.

BACKGROUND OF THE DISCLOSURE

(1) Field of the Invention

The instant invention generally relates to a liquid dispensing system with an unvented dispensing tap that requires a separate vent opening to prevent paneling of the container when product is dispensed from the tap.

(2) Description of Related Art

Existing dispensing systems with unvented dispensers require a separate vent opening to allow proper operating of the dispensing tap and to prevent paneling of the container caused by a vacuum within the container as product is dispensed. An example of this type of system is a large format laundry detergent container. The existing systems typically include a vent opening with a threaded neck and a closure which is screwed tightly closed for storage and handling, but which must be partially unscrewed to allow air into the vent opening during use. This required action is a particular point of complaint for the consumer. Many users fail to unscrew the closure, or fail to unscrew it a sufficient amount, to allow appropriate venting for proper performance of the dispensing tap.

SUMMARY OF THE DISCLOSURE

The present disclosure describes a self-venting closure assembly which does not require any action by the consumer for proper functionality.

An exemplary embodiment comprises a self-venting closure assembly comprising a closure body having a deck with a peripheral mounting skirt and an annular seal on an underside of the deck adjacent to the peripheral mounting skirt. The closure is configured for and intended to be used with a container for a liquid product which has an unvented dispensing tap.

In some embodiments the mounting skirt may be threaded or provided with bayonet type connection so that it can be removably mounted onto a neck of a vent opening in the container. In other embodiments, the mounting skirt may be permanently secured about the vent opening of the container. The annular seal may in some embodiments comprise an annular gasket received between the deck and the lip of the vent opening in the container. In other embodiments the annular seal may comprise a sealing rib which extends downwardly from the underside of the deck and engages the container neck.

With respect to the venting function, the closure body includes a circular valve seat within the center portion of the deck, and a plurality of vent openings concentrically spaced around the center of the valve seat.

An elastomeric umbrella valve includes a mounting stem centrally mounted through a mounting hole in the deck and has a frustoconical valve flap arranged on an underside of the valve seat. The inner peripheral edge of the mounting hole may include a taper or chamfer which facilitates insertion of the valve mounting button. The valve flap extends radially outward from the mounting stem and cooperates with the vent openings to normally seal the vent openings, but permits air to flow into an interior of the closure body when a vacuum is applied to an interior of the container on which the closure is mounted.

In some embodiments, an annular spillover wall may extend down from the underside of the deck encircling the vent openings and the umbrella valve seat area. The spillover wall may reduce or limit the amount of liquid from the container that contacts the valve when the container is tipped. Additionally, the annular wall protects the valve from being disturbed during handling and shipping where the closures may be nested.

It can thus be appreciated that the exemplary embodiment provides a unique self-venting closure which eliminates the need for the consumer to manually open a vent cap while also reducing any potential leak points between the liquid product in the container and the environment.

BRIEF DESCRIPTION OF THE DRAWING FIGURES

While the specification concludes with claims particularly pointing out and distinctly claiming particular embodiments of the instant invention, various embodiments of the invention can be more readily understood and appreciated from the following descriptions of various embodiments of the invention when read in conjunction with the accompanying drawings in which:

DETAILED DESCRIPTION OF THE EXEMPLARY EMBODIMENTS

Figure 1:
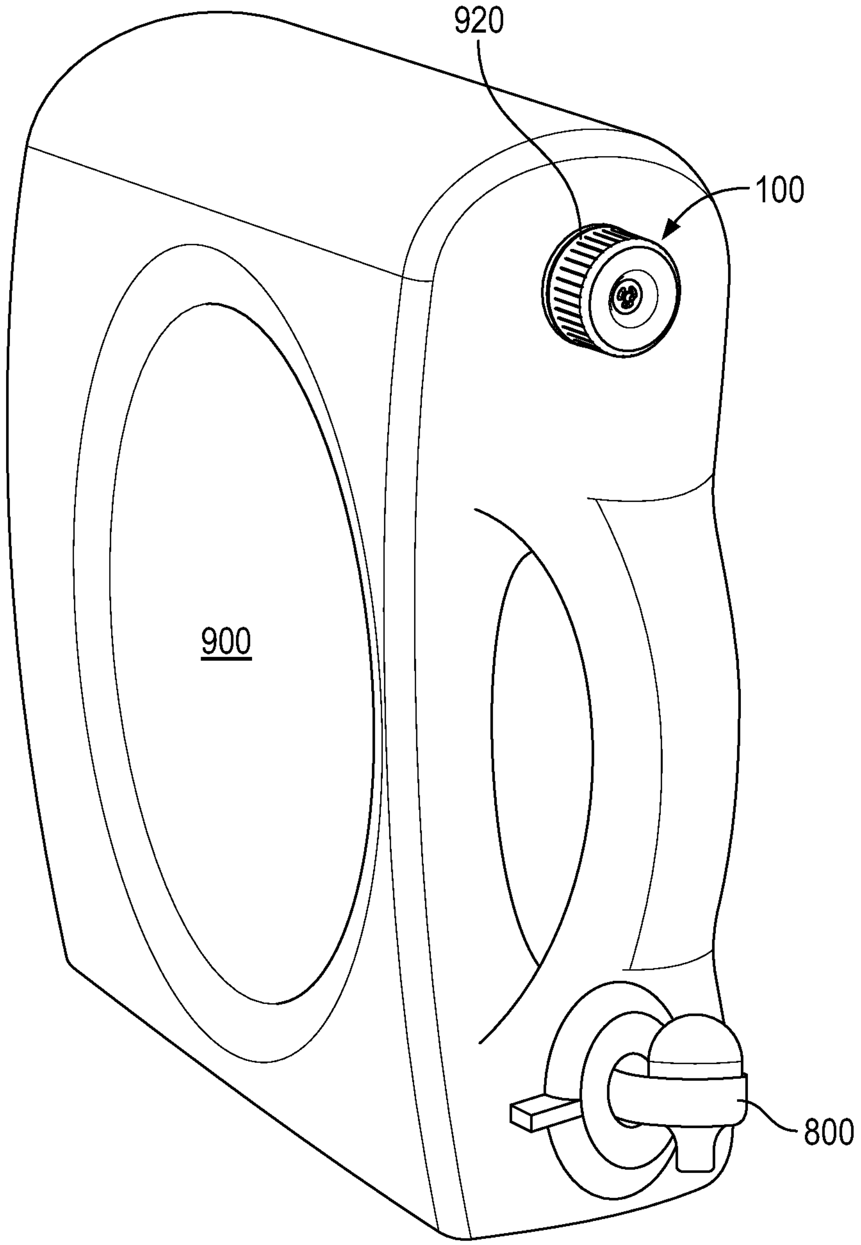
FIG. 1 is a perspective view of an exemplary embodiment of a self-venting closure mounted on a container with a dispensing tap in accordance with the present invention.
Figure 2:
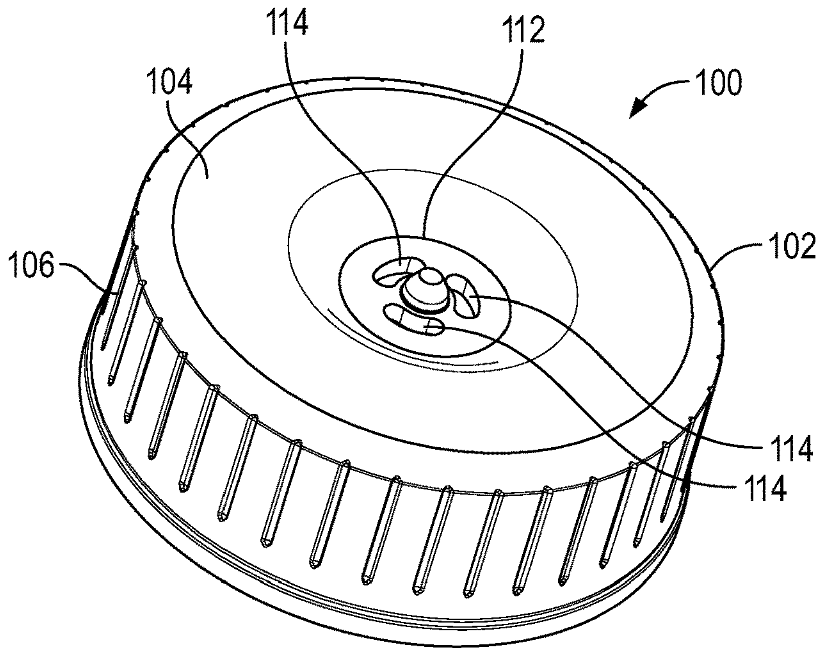
FIG. 2 is a perspective view of the self-venting closure.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

Referring now to the drawings, an exemplary embodiment of a self-venting closure 100 is illustrated in FIGS. 1-8. While reference is made to dispensing systems for liquid products, it should be understood that the presently described types of self-venting closures can also be used with other dispensing systems.

Referring to FIG. 1, an exemplary dispensing container 900 and self-venting closure 100 is illustrated. The container 900 is generally configured for holding a volume of liquid product (not shown) which can be dispensed through a tap-like dispenser 800. The container 900 may be formed from a blow-molded plastic material or may be formed by and from other means and materials. The dispensing tap 800 may be unvented and thus the container 900 may require a separate vent opening 910 to allow proper operating of the dispensing tap 800 and to prevent paneling of the sidewalls of the container 900 caused by a vacuum within the container 900 as product (not shown) is dispensed from the tap 200. An example of this type of system is a large format laundry detergent container, but other liquid dispensing systems and dispensing taps are also contemplated.

Figure 4:
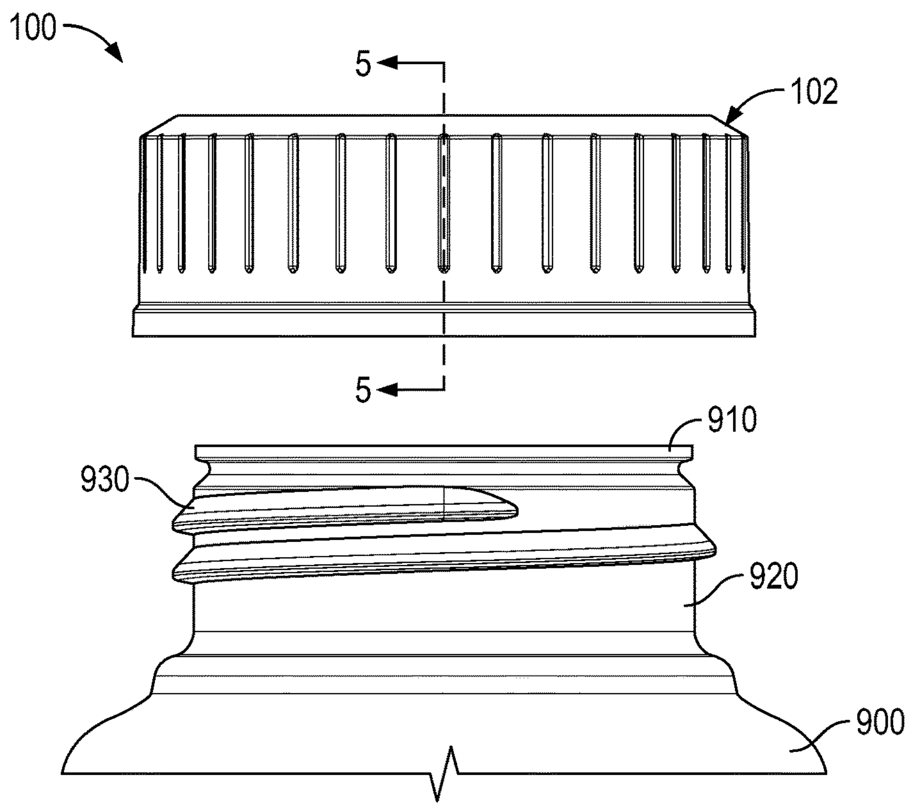
FIG. 4 is a plan view thereof shown with an exemplary venting neck.

Referring briefly to FIGS. 1 and 4, the vent opening 910 comprises a neck 920 which projects from the container 900 at a location which will be positioned above the liquid level when the container is in use.

An exemplary self-venting closure assembly 100 comprises a closure body 102 having a deck 104 with a peripheral mounting skirt 106 extending therefrom and an annular seal 108 on an underside of the deck 104 adjacent to the peripheral mounting skirt 106. The seal 108 is intended to cooperate with the container neck 920 to form a seal between the underside of the deck 104 and the container neck 920. The closure body 102 may be molded or otherwise formed from a high-density polyethylene (HDPE) plastic, or other suitable plastic material.

Figure 3:
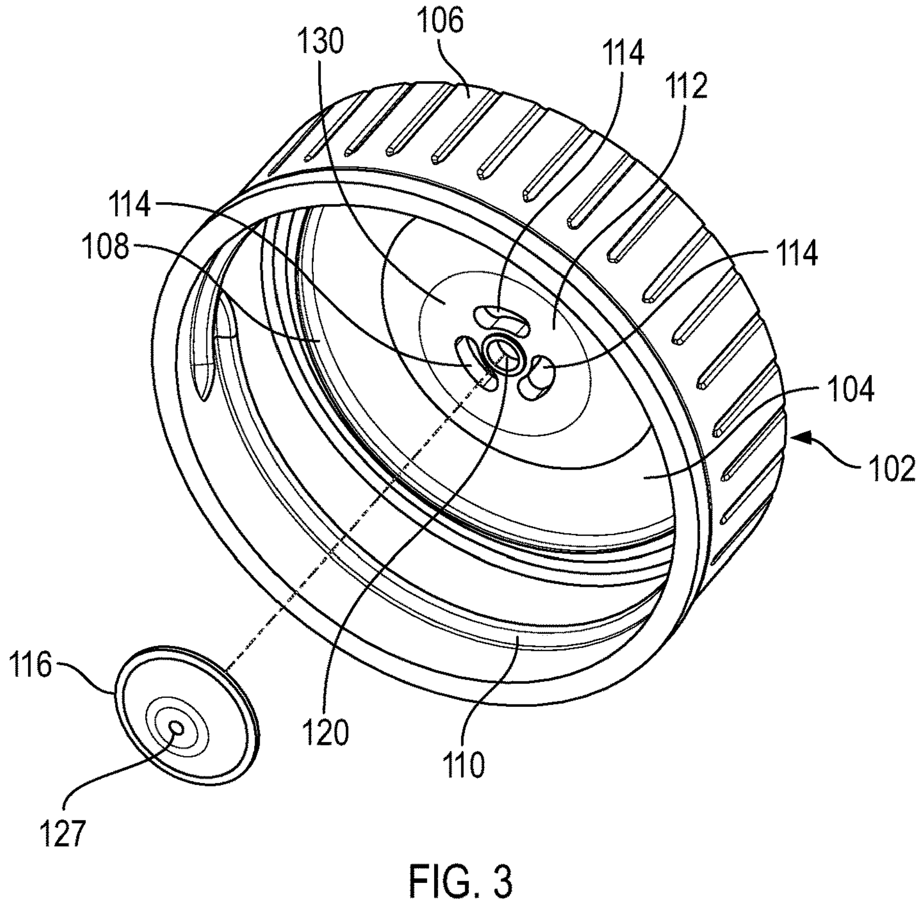
FIG. 3 is an exploded perspective view thereof.
Figure 5:
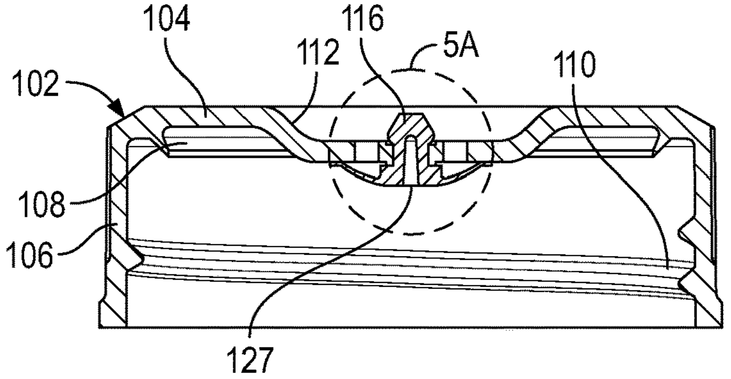
FIG. 5 is a cross-sectional view thereof taken along line 5-5 of FIG. 4.

In some embodiments the mounting skirt 106 and container neck 920 may include complementary mounting formations for releasable or permanent attachment of the closure body 100 to the container 900. For example, the mounting formations may comprise mating threads 110/930 or bayonet surfaces. In some embodiments the mounting skirt 106 may be inwardly threaded as illustrated in FIGS. 3 and 5 so that it can be removably mounted onto a similarly threaded or configured neck 920 of the vent opening 910 in the container 900. In other embodiments, the mounting skirt 106 may be permanently secured about the vent opening 910 of the container 900 by ultrasonic welding or other securing means.

The annular seal 108 may in some embodiments comprise an annular sealing rib which extends downwardly from the underside of the deck 104 to engage and cooperate with the container neck 920. Referring to FIG. 5, in the present embodiment the sealing rib 108 is v-shaped and angled slightly inward so that it extends over the upper lip of the vent neck 920 and rolls inwardly forming a tight seal.

The self-venting function is provided by a circular valve seat 112 within the center portion of the deck 104, a plurality of vent openings 114 concentrically spaced around the center of the valve seat 112 and an umbrella valve 116.

The valve seat 112 may be flush with the rest of the deck 104 or may be slightly recessed inwardly. At least one vent opening 114 must be provided. However, a plurality of circumferentially spaced vent openings 114 has been found to be particularly effective.

Figure 7:
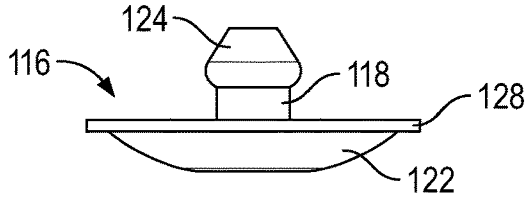
FIG. 7 is plan view of the umbrella valve.
Figure 8:
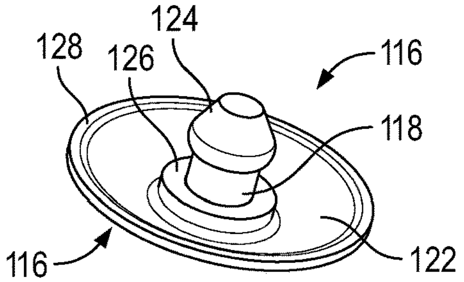
FIG. 8 is a perspective view of the umbrella valve.
Figure 9:
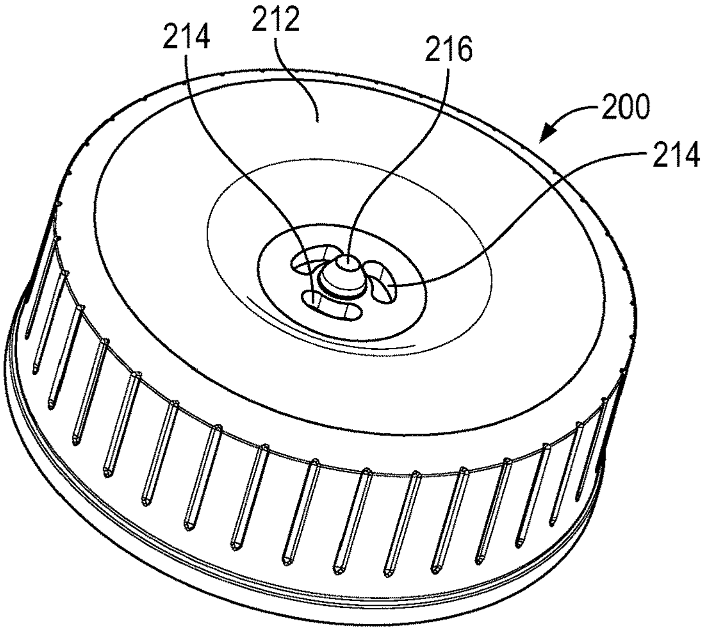
FIG. 9 is a perspective view of another exemplary embodiment of a self-venting closure

Referring to FIGS. 7 and 8, the elastomeric umbrella valve 116 includes a mounting stem 118 mounted through a mounting hole 120 in the center deck 104 and further has a frustoconical valve flap 122 arranged to extend from the mounting stem 118 to an underside of the valve seat 112. The umbrella valve 116 may be formed from silicone or other similar elastomeric materials. To retain the umbrella valve 116 in the mounting hole 120, the mounting stem includes an upper tapered button shoulder 124 and a lower retaining shoulder 126, the button portion 124 being pressed through the mounting hole 120 from beneath so that it sits above the valve seat 112 and the lower shoulder 126 being received below the valve seat 112. The mounting stem 118 forms a seal against the inner wall of the mounting hole 120. The valve 116 also includes an axial relief opening 127 extending inwardly into the stem 118 from the outside of the valve flap 122. The relief opening 127 is intended to provide inward flexure of the stem 118 during press fit and may also facilitate operational opening and closing flexure of the valve flap 122 during venting.

The valve flap 122 extends radially outward from the mounting stem 118 terminating in a peripheral annular sealing rim 128 with a flat sealing surface that engages with a circular land area 130 encircling the vent openings 114. The valve flap 122 cooperates with the vent openings 114 and land area 130 to normally seal the vent openings 114 from the interior of the closure body 102, but elastically deforms to permit air to flow into an interior of the closure body 102 when a vacuum is applied to an interior of the container 900 on which the closure 100 is mounted.

Figure 5A:
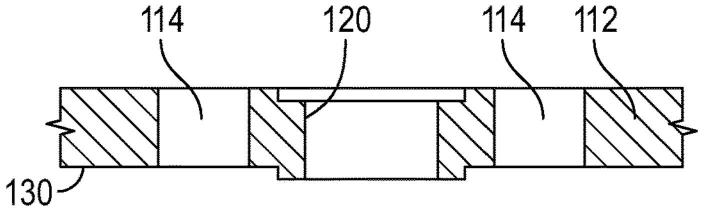
FIG. 5A is an enlarged view of the mounting hole from FIG. 5 with the umbrella valve removed for clarity.
Figure 6:
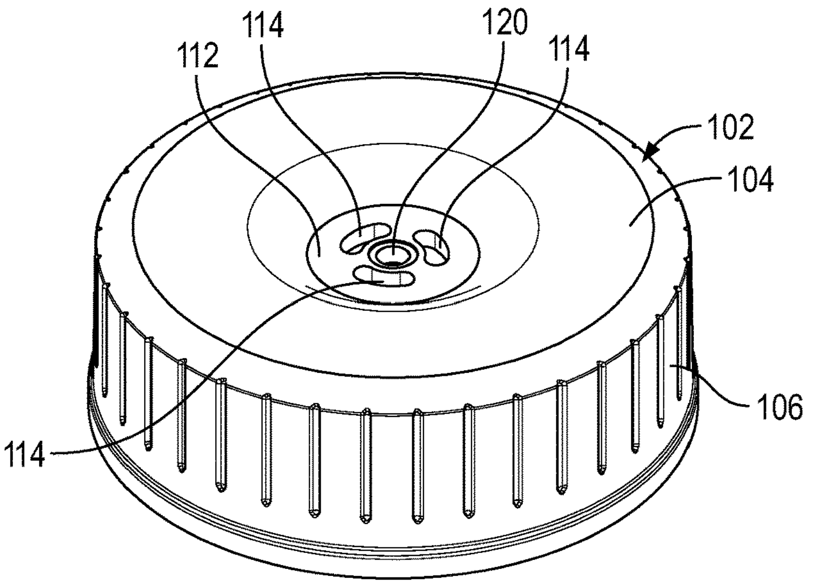
FIG. 6 is a perspective view of the closure body.

It can be seen in enlarged FIG. 5A that the upper and lower surfaces immediately surrounding the mounting hole 120 may be offset inwardly from the remainder of the valve seat 112. This offset may allow the maker to reduce the preloaded tension normally molded into the umbrella valve structure 116. Lowering the position of the valve flap 122 and sealing rim 128 relative to the land surface 130 decreases the normal sealing force and allows adjustment of the amount of vacuum required to open the valve 116.

Referring now to FIGS. 9-14 another exemplary embodiment of a self-venting closure assembly is illustrated and generally indicated at 200. The closure assembly 200 is generally the same as the previously described embodiment 100 and includes the same closure body 202, valve seat 212, vent openings 214, and umbrella valve 216, with only the following differences.

Figure 10:
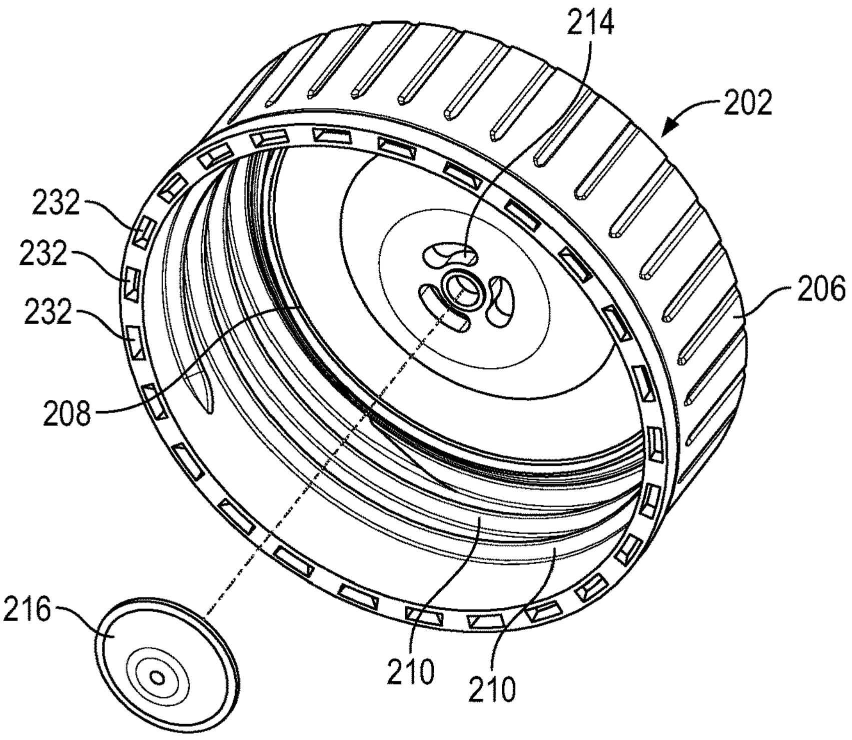
FIG. 10 is an exploded perspective view thereof.
Figure 11:
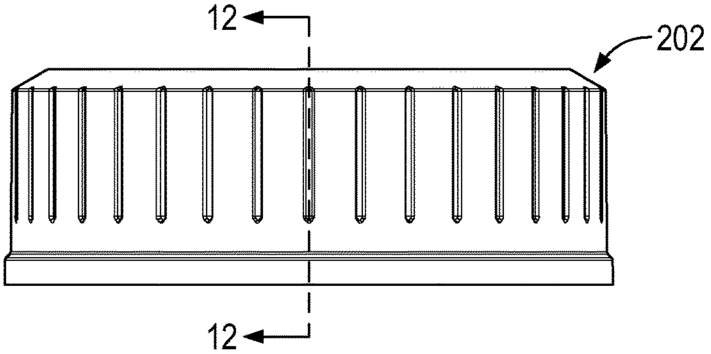
FIG. 11 is a plan view thereof.
Figure 14:
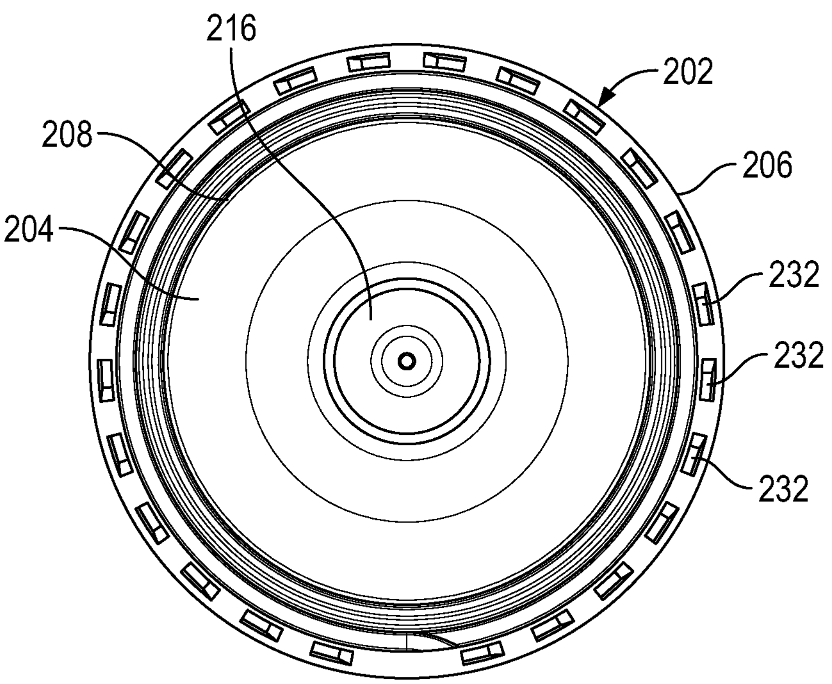
FIG. 14 is bottom view of the closure body.
Figure 15:
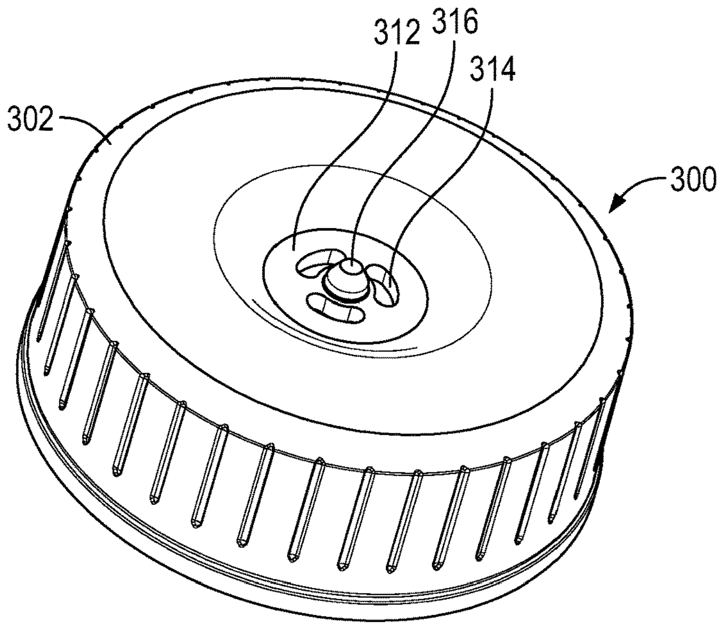
FIG. 15 is a perspective view of yet another exemplary embodiment of a self-venting closure.

Referring to FIGS. 10 and 14, the lower edge of the mounting skirt 206 is provided with a plurality of unscrewing "dogs" 232 or indentations which engage with a like plurality of projections (not shown) on the container 900 to prevent unscrewing of the closure 200 once mounted. The mounting skirt 206 has several additional rotations of threads 210 to strengthen the closure force.

Figure 12:
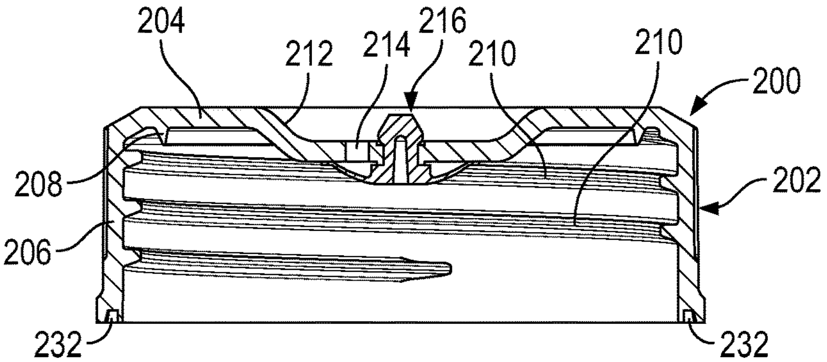
FIG. 12 is a cross-sectional view thereof taken along line 12-12 of FIG. 11.
Figure 13:
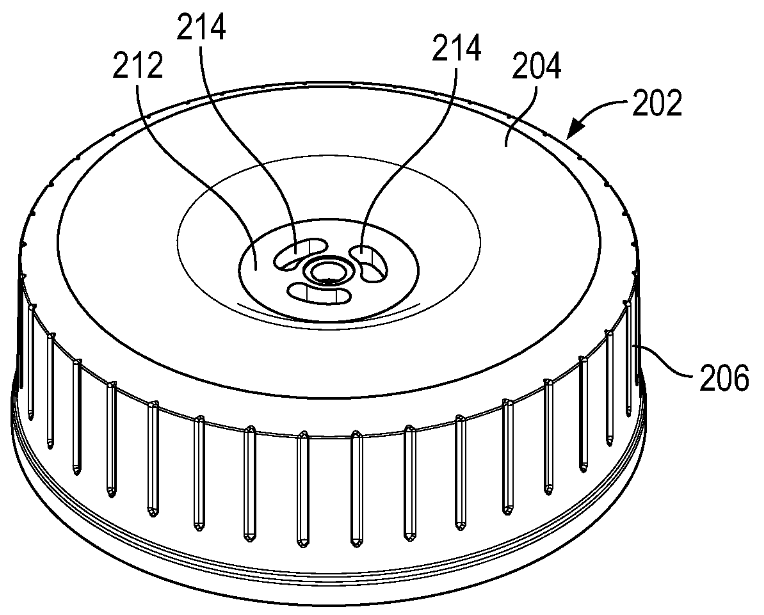
FIG. 13 is a perspective view of the closure body.

Referring to FIG. 12, it can be seen that in some embodiments the annular seal 208 may comprise a v-shaped rib without the inward angle. The straight v-shape can be used with the additional threads 210 which provide added sealing force against the underside of the closure deck 204.

The closure 200 is otherwise similar in structure and function to the embodiment 100 described above.

Referring now to FIGS. 15-19, yet another exemplary embodiment of a self-venting closure assembly is illustrated and generally indicated at 300. This closure assembly 300 is also generally the same as the previously described embodiment 100 and includes the same closure body 302, valve seat 312, vent openings 314 and umbrella valve 316, with only the following differences.

Figure 16:
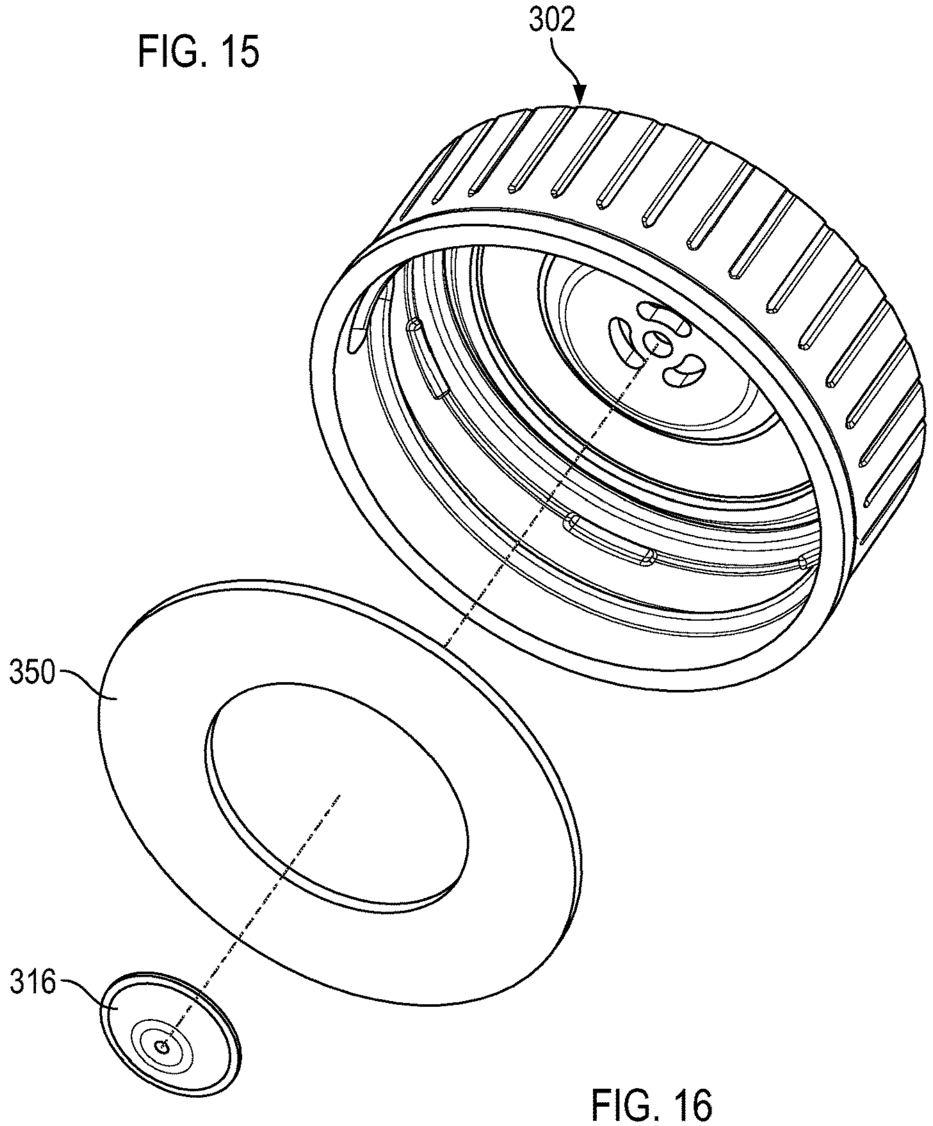
FIG. 16 is an exploded perspective view thereof.
Figure 17:
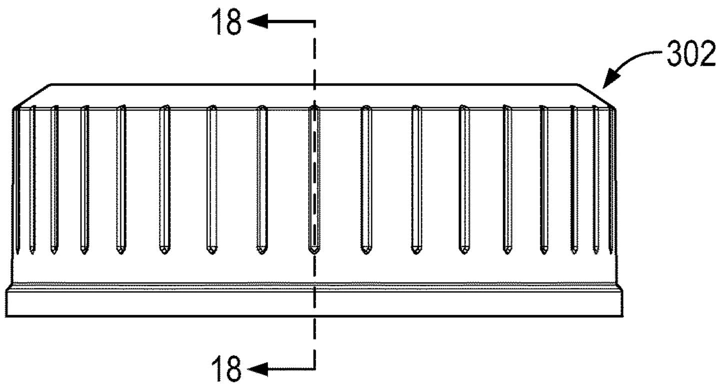
FIG. 17 is a plan view thereof.
Figure 18:
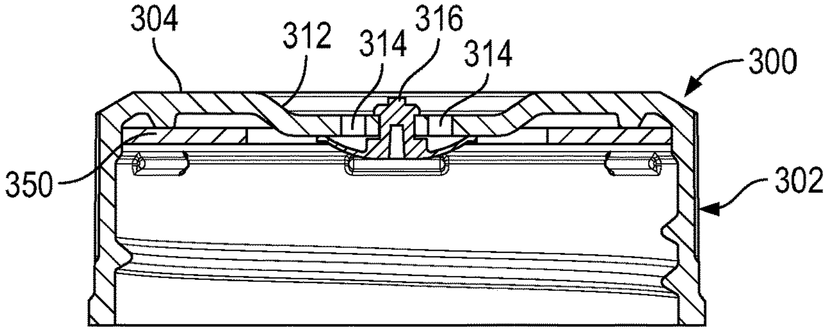
FIG. 18 is a cross-sectional view thereof taken along line 18-18 of FIG. 17.
Figure 19:
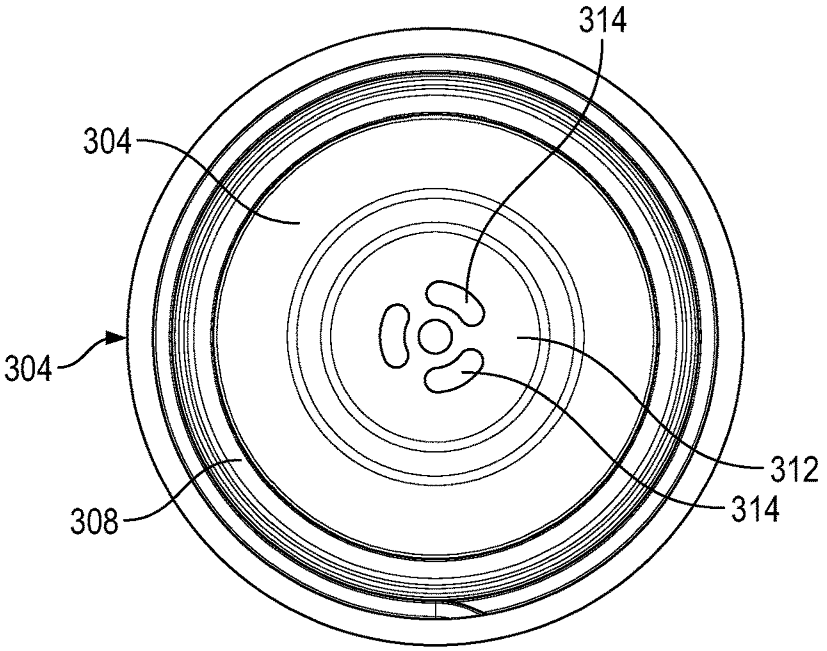
FIG. 19 is a bottom view of the closure body.
Figure 20:
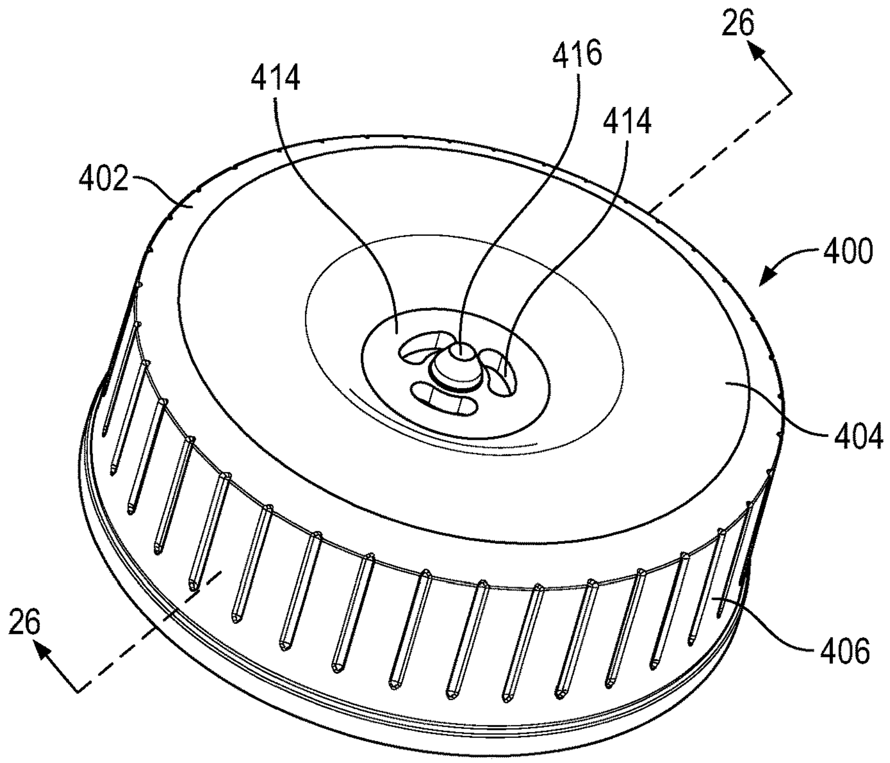
FIG. 20 is a perspective view of another exemplary embodiment of a self-venting closure.
Figure 21:
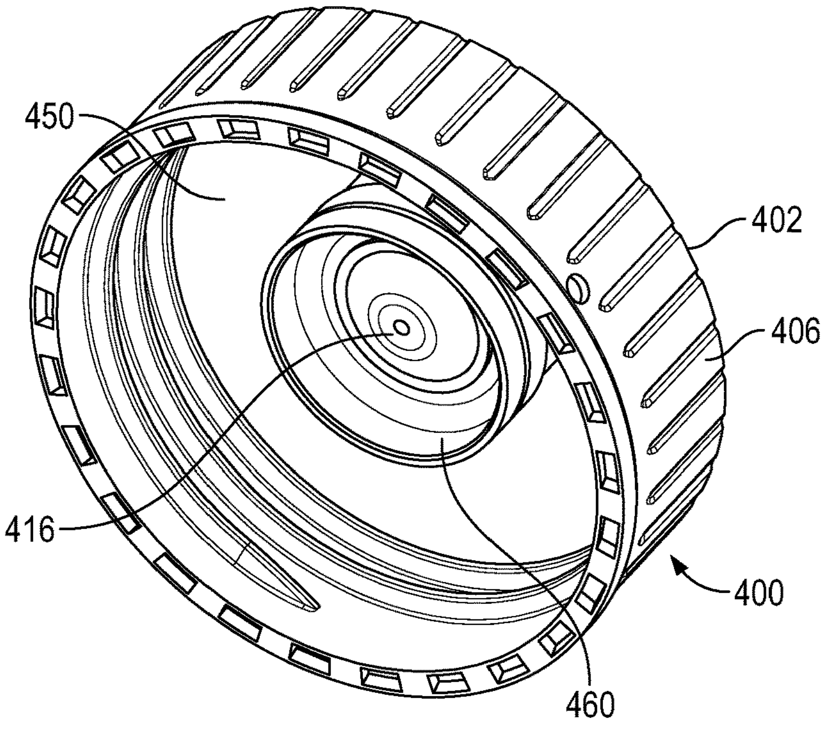
FIG. 21 is a bottom perspective view thereof.

Referring to FIGS. 16 and 18, the assembly 300 further includes an annular foam or elastomeric gasket 350 received between the underside of the deck 304 and the upper lip of the vent opening 910 in the container 900.

Referring to FIG. 18 in particular, it can be seen that the annular seal 308 may comprise a flattened rib with a slight inward angle on its outer peripheral surface which is effective for squeezing the gasket 350 against the vent neck 920. Additionally, the valve seat 312 does not contain any offset providing the umbrella valve 316 with a full preloaded tension as molded.

The closure 300 is otherwise similar in structure and function to the embodiment 100 described above.

Referring now to FIGS. 20-26, another exemplary embodiment of a self-venting closure assembly is illustrated and generally indicated at 400. This closure assembly 400 is generally the same as the previously described embodiment 300, including a closure body 402 with an upper deck 404, threaded peripheral mounting skirt 406, valve seat area 412, central mounting hole 420, vent openings 414 and umbrella valve 416. As noted above, other mounting structures for the skirt 406 are also contemplated.

Similar to embodiment 300, an annular foam or elastomeric gasket 450 is received between the underside of the deck 404 and the upper lip of the vent opening 910 in the container 900. As also seen in the previous embodiment in FIG. 18, annular seal 408 may be a flattened rib with a slight inward angle on its outer peripheral surface which is effective for squeezing the gasket 450 against the vent neck 920. The valve seat 412 does not contain any offset providing the umbrella valve 416 with a full preloaded tension as molded.

Figure 22:
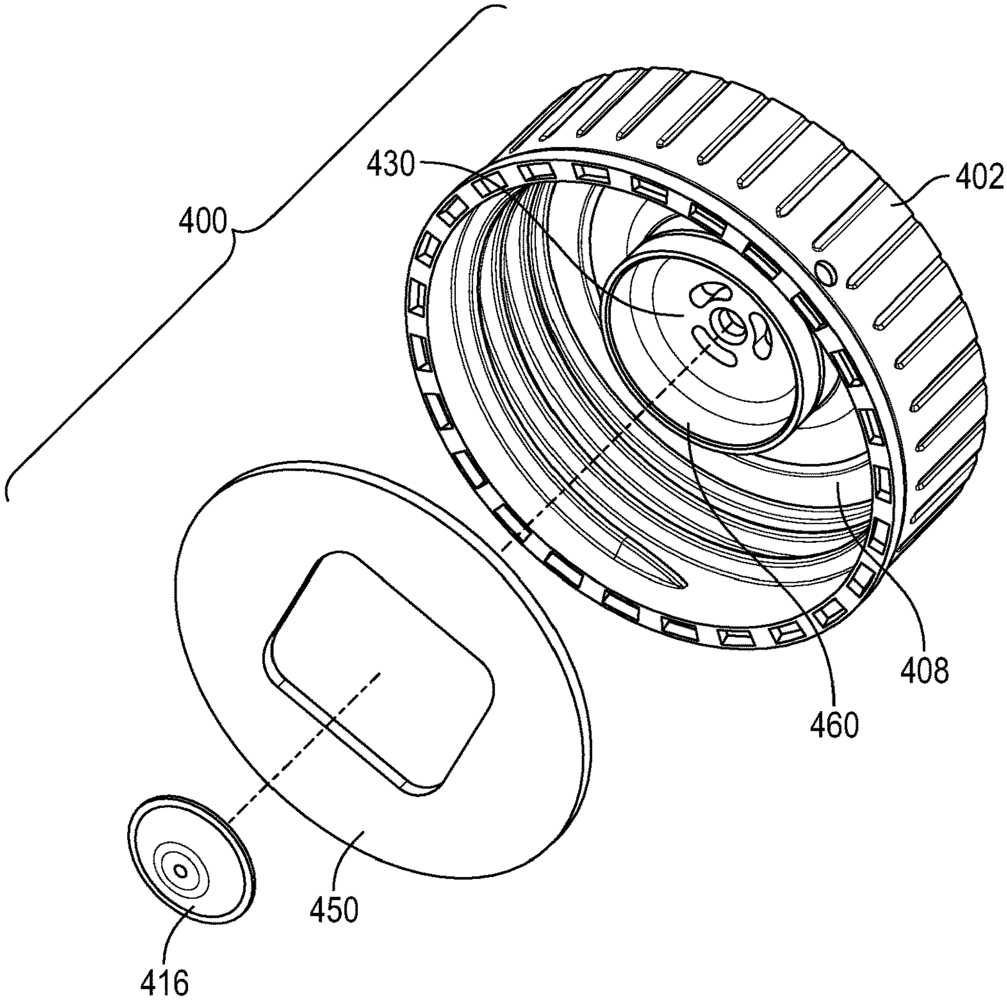
FIG. 22 is an exploded perspective view thereof.
Figure 23:
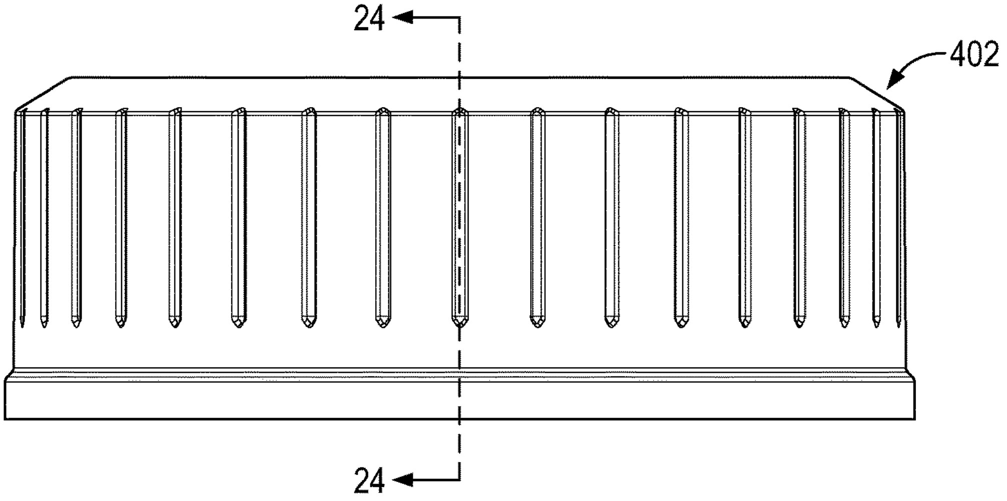
FIG. 23 is a plan view thereof.
Figure 24:
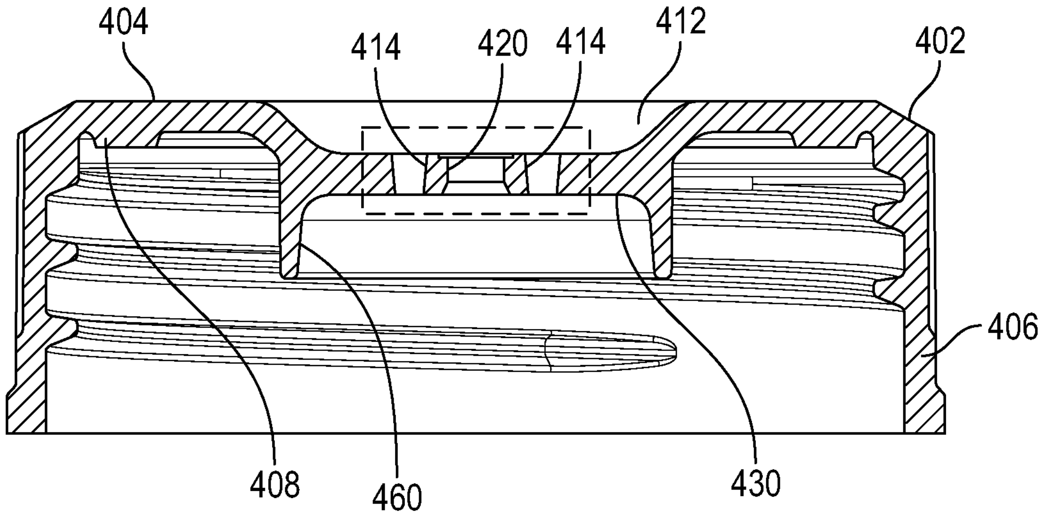
FIG. 24 is a cross-sectional view thereof taken along line 24-24 of FIG. 23 (valve and gasket removed for clarity)

As best seen in FIGS. 22 and 24, the present embodiment further includes an annular spillover wall 460 extending downwardly from the bottom of the valve seat area 412 surrounding the valve land area 430 and umbrella valve 416. The annular spillover wall 460 may reduce or limit the amount of liquid from the container that contacts the valve when the container is tipped, thereby improving valve performance. Additionally, the annular spillover wall 460 protects the umbrella valve 416 from being disturbed during shipping and handling where the closures may be nested. It is important that the valve seal remains undisturbed during shipping and handling so that particulates do not get between the umbrella valve 416 and the valve land area 430.

Figure 24A:
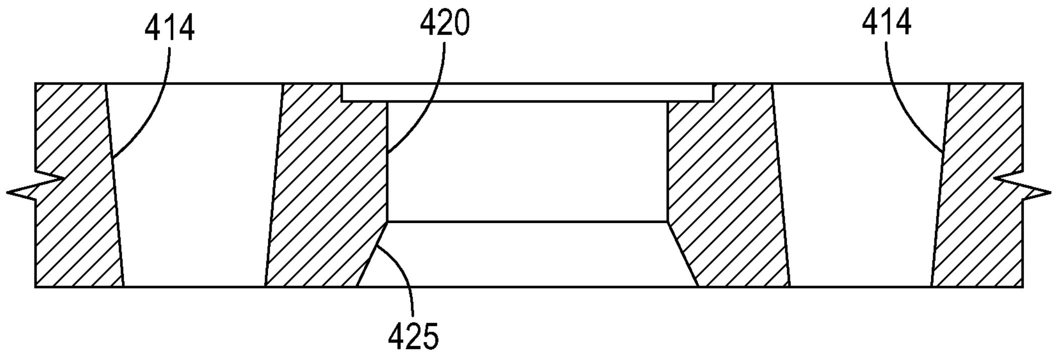
FIG. 24A is an enlarged view of the mounting hole from FIG. 24.
Figure 25:
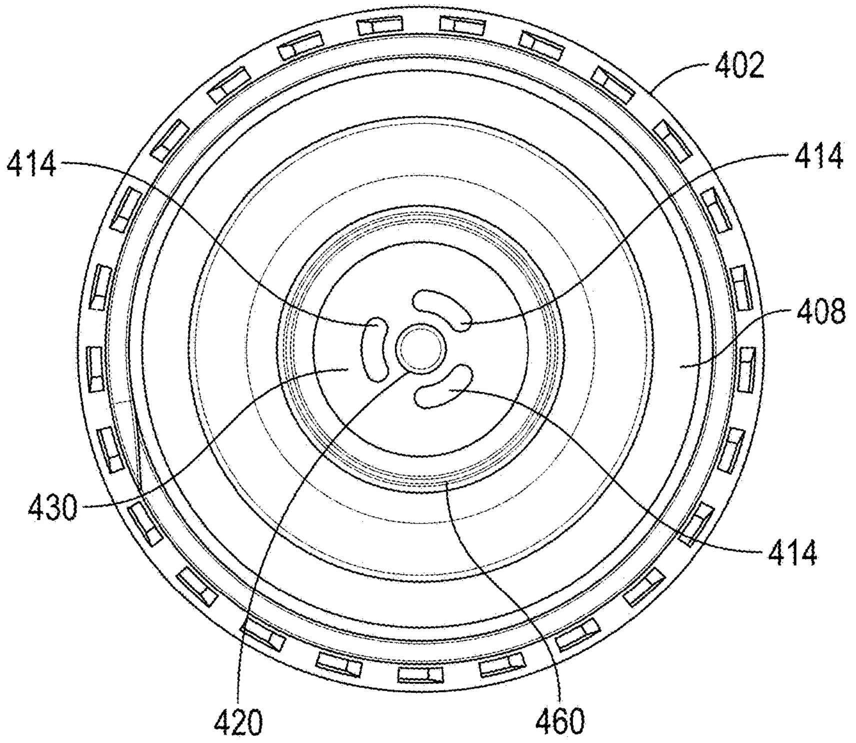
FIG. 25 is a bottom view thereof.
Figure 26:
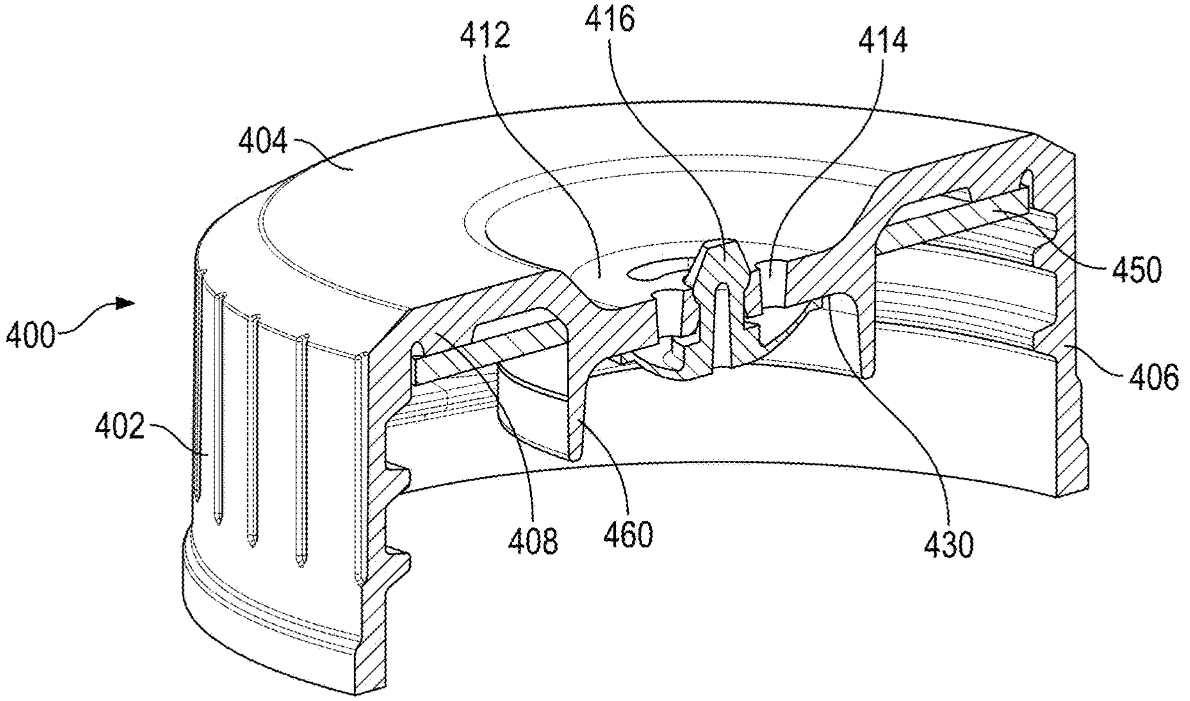
FIG. 26 is another cross-sectional view thereof taken along line 26-26 of FIG. 20 (valve and gasket installed)

Referring to FIG. 24A, the inner peripheral edge of the central mounting hole 420 includes an inward taper or chamfer 425 which creates a funnel to guide the tapered shoulder button 424 of the umbrella valve through the central mounting hole 420. This tapered geometry facilitates assembly of umbrella valve 416 with the closure 402. Additionally, it can be seen that venting holes 414 are also slightly tapered from the outside to the inside to funnel air inwardly during venting.

Figure 27:
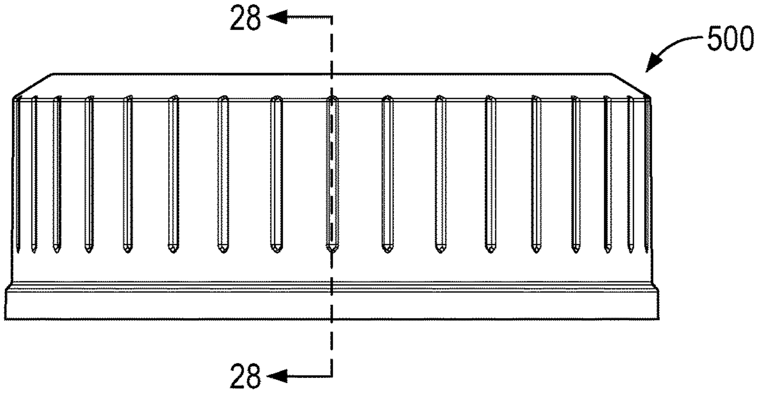
FIG. 27 is a side view of another exemplary embodiment similar to that shown in FIGS. 20-24 using a sealing flange in the place of the gasket arrangement.
Figure 28:
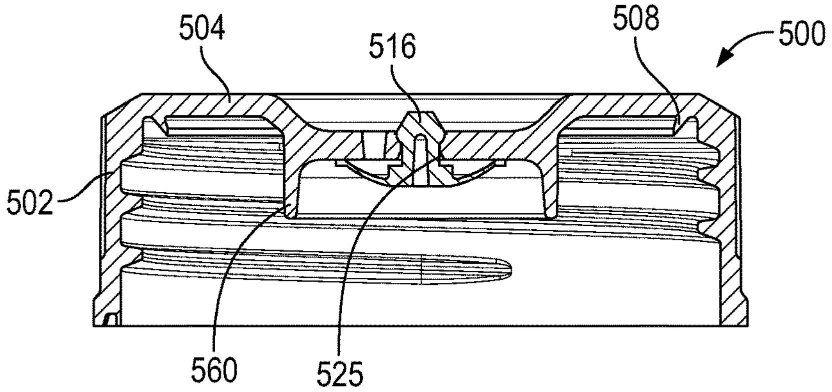
FIG. 28 is a cross-sectional view thereof taken along line 28-28 of FIG. 27.
Figure 29:
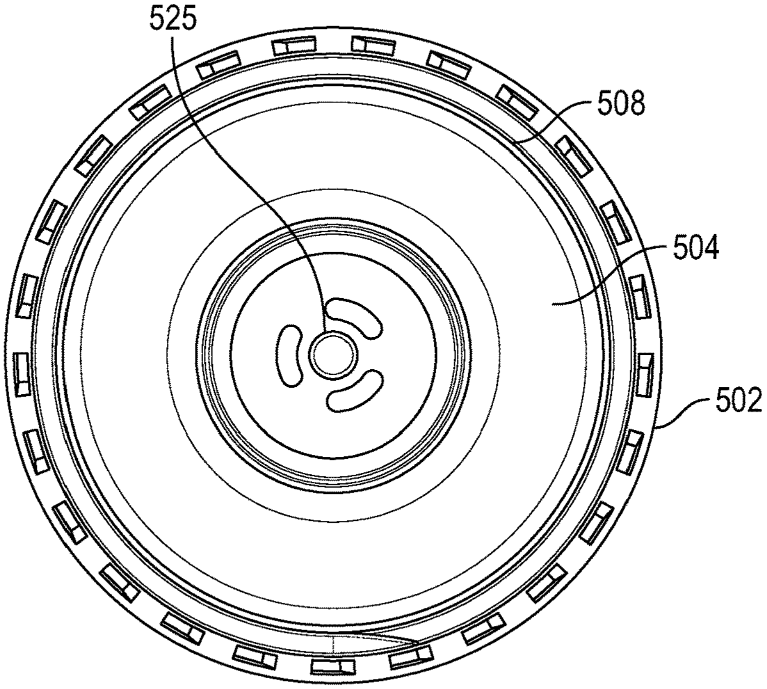
FIG. 29 is a bottom view thereof.

Referring now to FIGS. 27-29, still another exemplary embodiment of a self-venting closure assembly is illustrated and generally indicated at 500. This closure assembly 500 is generally the same as the previously described embodiment 400, including a closure body 502, umbrella valve 516, mounting hole chamfer 525, annular wall 560, with the exception that the annular seal 508 may comprise an annular sealing rib extending downwardly from the underside of the deck 504 to engage and cooperate with the container neck 920 in the same manner as described with embodiment 100 and as shown in FIGS. 1-8. As seen in FIG. 28, sealing rib 508 is also v-shaped and angled slightly inward so that it extends over the upper lip of the vent neck 920 and rolls inwardly forming a tight seal.

It can thus be appreciated that the exemplary embodiments provide unique configurations of a self-venting closure assemblies which simplify and reduce the number of parts and provide automatic venting without customer intervention, while also reducing the number of potential leak points between the liquid container and the exterior environment.

While there is shown and described herein certain specific structures embodying various embodiments of the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A closure assembly comprising:

a closure body having a deck with a peripheral mounting skirt, an annular seal on an underside of the deck adjacent to the peripheral mounting skirt, wherein the annular seal comprises an annular flat sealing rib extending downwardly from the underside of the deck and an annular gasket received adjacent to the underside of the deck and in engagement with the annular flat sealing rib wherein an upwardly facing surface of the annular gasket is received in engaged facing relation with a downwardly facing surface of the annular flat sealing rib, a valve seat within the deck, at least one vent opening disposed within the valve seat, a valve land area on an underside of the valve seat surrounding the at least one vent opening, and an annular spillover wall extending downwardly from the underside of the valve seat and surrounding the valve land area; and an elastomeric umbrella valve mounted to the deck and having a valve flap arranged on the underside of the valve seat in sealing engagement with the valve land area, said valve flap cooperating with said at least one vent opening to normally seal said at least one vent opening but permitting air to flow into an interior of the closure body.

2. The closure assembly of claim 1 wherein the annular seal comprises an annular v-shaped sealing rib extending downwardly from the underside of the deck.

3. The closure assembly of claim 2 wherein the v-shaped sealing rib angles radially inwardly.

4. The closure assembly of claim 1 wherein the umbrella valve includes an axial mounting stem removably received within a mounting hole in the valve seat.

5. The closure assembly of claim 4 wherein an inner peripheral edge of the mounting hole includes an inward chamfer.

6. The closure assembly of claim 5 wherein the mounting stem includes a tapered button shoulder configured to cooperate with said inward chamfer of said mounting hole and facilitate a press fit through the mounting hole.

7. The closure assembly of claim 6 wherein the umbrella valve further comprises an axial relief opening extending inwardly into the mounting stem.

8. The closure assembly of claim 4 wherein said at least one vent opening comprises a plurality of vent openings spaced circumferentially around the mounting hole and the valve flap extends radially outwardly from the mounting stem to seal said plurality of vent openings.

9. The closure assembly of claim 8 wherein said valve flap includes an annular sealing rim which engages with said valve land area.

10. The closure assembly of claim 1 wherein the peripheral mounting skirt includes mounting formations configured for engagement with a container neck.

11. The closure assembly of claim 8 wherein the umbrella valve further comprises an axial relief opening extending inwardly into the mounting stem.

12. The closure assembly of claim 4 wherein the umbrella valve further comprises an axial relief opening extending inwardly into the mounting stem.

13. The closure assembly of claim 1 wherein said valve flap includes an annular sealing rim which engages with said valve land area.

14. The closure assembly of claim 4 wherein said at least one vent opening comprises a plurality of vent openings and the valve flap extends radially outwardly from the mounting stem to seal said plurality of vent openings.

15. The closure assembly of claim 14 wherein said valve flap includes an annular sealing rim which engages with said valve land area.

16. The closure assembly of claim 1 wherein an outer peripheral surface of the annular flat sealing rib has an inward angle configured to squeeze the annular gasket against and an associated vent neck.

17. The closure assembly of claim 1 wherein the annular gasket extends from the peripheral mounting skirt to the inner spillover wall.

* * * * *